Figure 1:
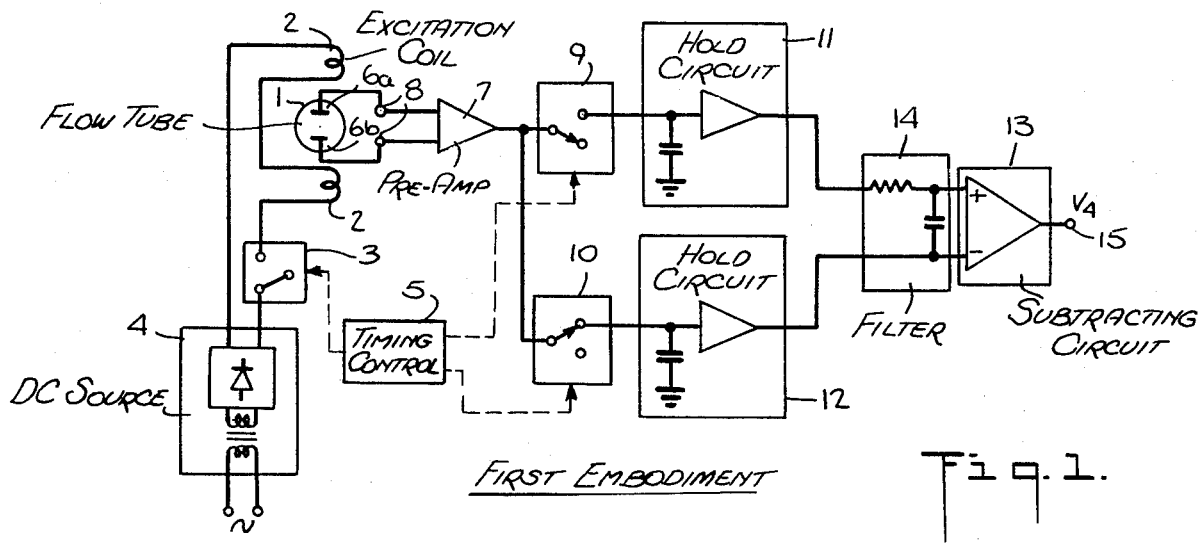

United States Patent [19]
Watanabe

[11] 3,965,738
[45] June 29, 1976

[54] MAGNETIC FLOWMETER

[75] Inventor: Masayasu Watanabe, Yokohama, Japan

[73] Assignee: Hokushin Electric Works, Ltd., Tokyo, Japan

[22] Filed: July 29, 1974

[21] Appl. No.: 492,766

[30] Foreign Application Priority Data
July 31, 1973 Japan.................................. 48-86612

[52] U.S. Cl............................................ 73/194 EM
[51] Int. Cl.².......................................... G01F 1/58
[58] Field of Search.............................. 73/194 EM

[56] References Cited
UNITED STATES PATENTS

| | | | |
|---|---|---|---|
| 3,316,762 | 5/1967 | Westersten..................... | 73/194 EM |
| 3,550,446 | 12/1970 | Tucker et al. .................. | 73/194 EM |
| 3,759,097 | 9/1973 | Cushing.......................... | 73/194 EM |
| 3,783,687 | 1/1974 | Mannherz et al.............. | 73/194 EM |

*Primary Examiner*—Charles A. Ruehl

[57] ABSTRACT

A magnetic flowmeter wherein liquid to be metered is conducted through a flow tube to intersect a transverse magnetic field produced by an electromagnet, the voltage induced in the fluid being transferred to a pair of electrodes mounted at diametrically opposed positions on the tube. The electromagnet is excited by DC power which is applied thereto periodically, this being effected by means of a switch interposed between the electromagnet and the DC power source. When DC excitation is cut off by the switch, the output voltage of the flowmeter is fed to a first hold circuit, whereas during the excitation period, both the flow signal and zero voltage are fed to a second hold circuit. The outputs from both hold circuits are fed to an amplifier whereby the held zero signal is subtracted from the total voltage of flow signal and zero voltage in order to eliminate zero error due to polarization.

3 Claims, 12 Drawing Figures

FIRST EMBODIMENT

SECOND EMBODIMENT

THIRD EMBODIMENT

MAGNETIC FLOWMETER

BACKGROUND OF THE INVENTION

This invention relates generally to magnetic flowmeter systems, and in particular to a magnetic flowmeter whose electromagnet is excited by DC power applied thereto periodically.

In a magnetic flowmeter, the liquid whose flow rate is to be measured, is conducted through a flow tube provided with a pair of diametrically-opposed electrodes and an electromagnet establishing a magnetic field perpendicular to the longitudinal axis of the tube. When the flowing liquid intersects the magnetic field, a voltage is induced therein which is transferred to the electrodes. This voltage, which is proportional to the average velocity of the liquid and hence to its average volumetric rate, is then amplified and processed to actuate a recorder or indicator.

Historically, in volumetric flow measurement utilizing a magnetic flowmeter, it was originally the practice to use a DC magnetic field. However, when employing a DC magnetic field, a polarization effect occurs. It is therefore now the practice to use an AC magnetic field in the magnetic flowmeter in order to overcome this drawback, for with an alternating magnetic flux operation, the polarization effect is rendered negligible.

Though an AC-excitation type of magnetic flowmeter is clearly advantageous in that polarization is obviated and the AC flow-induced signal may be more easily amplified, it has the following distinct drawbacks.

1. Eddy currents which flow through the fluid to be metered are induced by the use of AC magnetic field, and these eddy currents introduce error signals.
2. Because of stray capacitance between the loop from the AC excitation source to the electrodes and the fluid, the resultant electrostatic induction gives rise to zero drift.
3. Since the output signal of the magnetic flowmeter is alternating, the amplitude of the signal is reduced by reason of the electrostatic capacitance of the cable connection between the detector and a transmitter. This drawback is more pronounced in the case of flow measurement of low conductivity fluids.
4. A spurious voltage, which is 90 degrees out of phase with the AC flow induced voltage, is generated from the signal leads, thereby producing a changing zero voltage.

SUMARY OF THE INVENTION

In view of the foregoing, the main object of this invention is to provide a magnetic flowmeter system which overcomes the disadvantages of an AC excitation system and yet is free from the polarization effect inherent in DC excitation.

More specifically, an object of this invention is to provide a magnetic flowmeter system, in which the electromagnet in the flowmeter is excited by periodically applied DC power, so that unwanted common mode noise is minimized without giving rise to polarization effects.

Briefly stated, in a magnetic flowmeter system in accordance with the invention, both the flow signal and the zero voltage generated during the excitation period are held by a first hold circuit and the zero signal generated during the nonexcitation period is held by a second hold circuit. Each held signal is fed to an amplifier system in which zero voltage is subtracted from the combined voltage of the flow signal and the zero voltage, in order to obtain an output signal directly proportional to the flow velocity.

OUTLINE OF THE INVENTION

For a better understanding of the invention, as well as other objects and further features thereof, reference is made to the following detailed description to be read in conjunction with the accompanying drawings, wherein like reference numerals in the several figures are used to designate like components.

Figure 4:
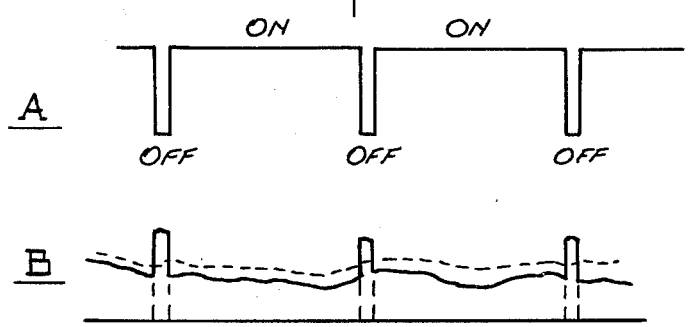
Figure 2:
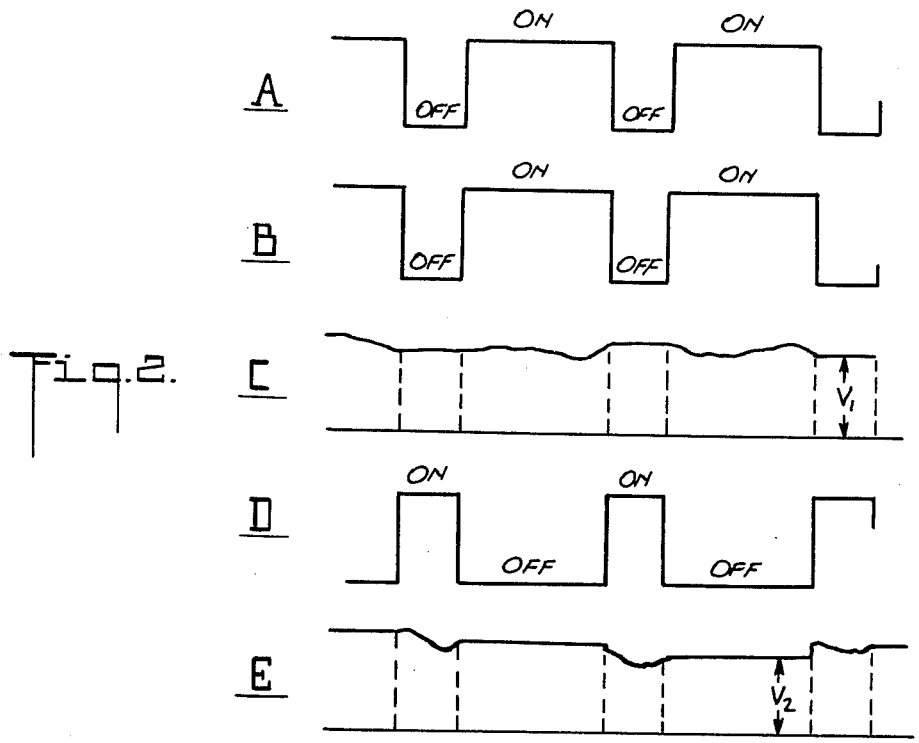
Figure 5:
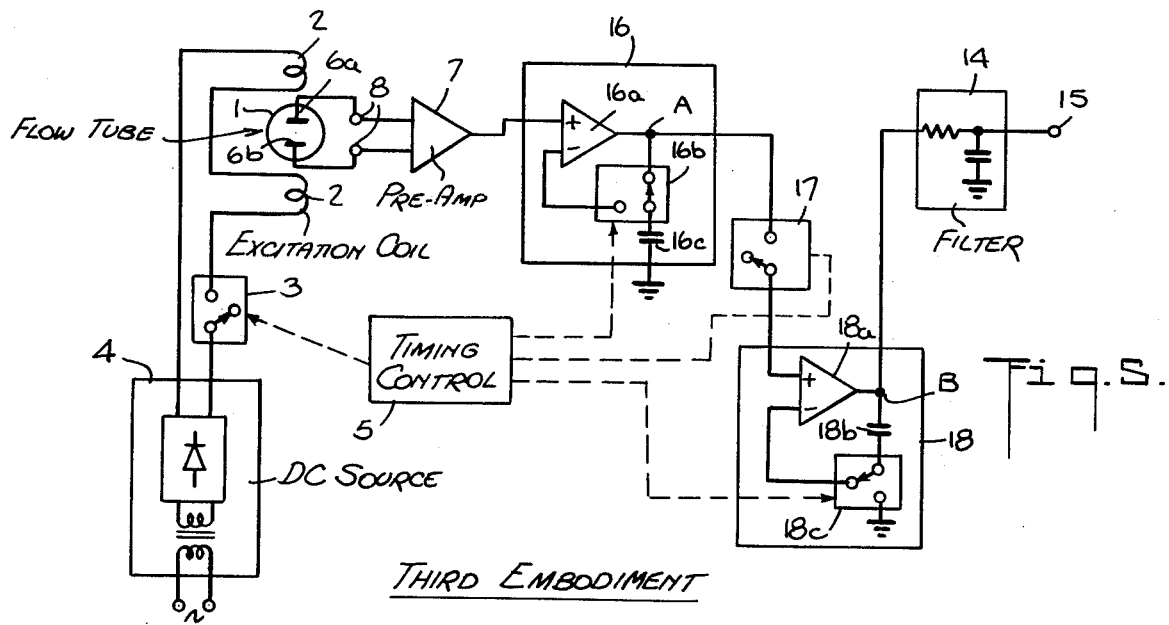
Figure 6:
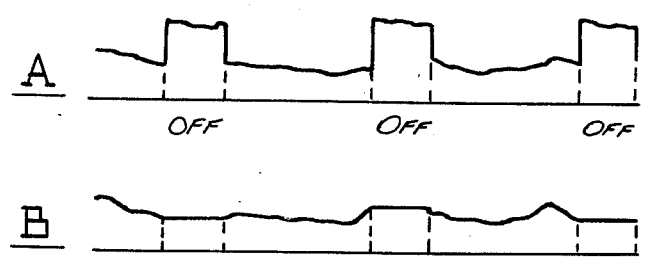

In the drawings:

FIG. 1 is a schematic diagram of a first preferred embodiment of a magnetic flowmeter in accordance with the invention;

FIGS. 2(a) to (e) are wave forms illustrating the operation of the first embodiment of the invention;

FIG. 3 is a schematic diagram of a second preferred embodiment of a magnetic flowmeter in accordance with the invention;

FIG. 4(a) and (b) are wave forms illustrating the operation of the second embodiment of the invention;

FIG. 5 is a schematic diagram of a third preferred embodiment of a magnetic flowmeter in accordance with the invention; and FIG. 6(a) and (b) are wave forms illustrating the operation of the third embodiment of the invention.

DESCRIPTION OF THE INVENTION

Before describing the structure and operation of the embodiments of the invention, we shall first consider the zero point problem which arises in a magnetic flowmeter with a DC magnet field as well as in a magnetic flowmeter with an AC magnetic field.

When a metal electrode is immersed in an electrolyte, a polarization potential is generated. It is well known that the magnitude of this voltage varies in accordance with the nature of the electrode and that of the fluid, and that it is also a function of temperature, pH and other factors. If the electrodes in a magnetic flowmeter are identical in character, nearly equal polarization potentials are generated at the respective electrodes.

Since these polarization potentials are developed in opposition to each other in the loop constituted by the electrodes and the liquid therebetween, the effect of the polarization potentials is for the most part eliminated. However, a slight error signal of 100 mV or so inevitably appears between the electrodes. The voltage existing between the electrodes in the non-excitation period represents the zero point in a DC magnetic flowmeter.

On the other hand, with AC magnetic flux operation, electromagnetic induction occurs in the magnetic flowmeter and eddy currents are induced. As previously mentioned, the eddy currents introduce error signals and hence give rise to zero drift.

First Embodiment: Referring now to FIG. 1, there is shown a first preferred embodiment of the invention. In this figure, the liquid to be metered is conducted through a flow tube 1. An excitation coil 2 connected through a switching circuit 3 to a DC source 4, serves to establish a magnetic field in the flow tube perpendicular to the direction of flow. A timing control circuit 5 serves to govern the operation of switching circuit 3. Electrodes 6a and 6b are disposed at diametrically-opposed positions on the flow tube along an axis which is perpendicular both to the longitudinal direction of flow and the transverse magnetic field.

The flowmeter is primarily constituted by flow tube 1, excitation coil 2 and electrodes 6a and 6b. A pre-amplifier 7 receives the signal voltage yielded at the output terminals 8 connected to the electrodes of the flowmeter. The output of pre-amplifier 7 is applied to switching circuits 9 and 10 which are respectively connected to hold circuits 11 and 12. These switching circuits are alternately driven by timing control circuit 5. The respective outputs of hold circuit 11 and 12 are fed through a filter circuit 14 to the non-inverting input terminal and the inverting terminal of a subtracting circuit 13 having an output terminal 15.

Figure 2:
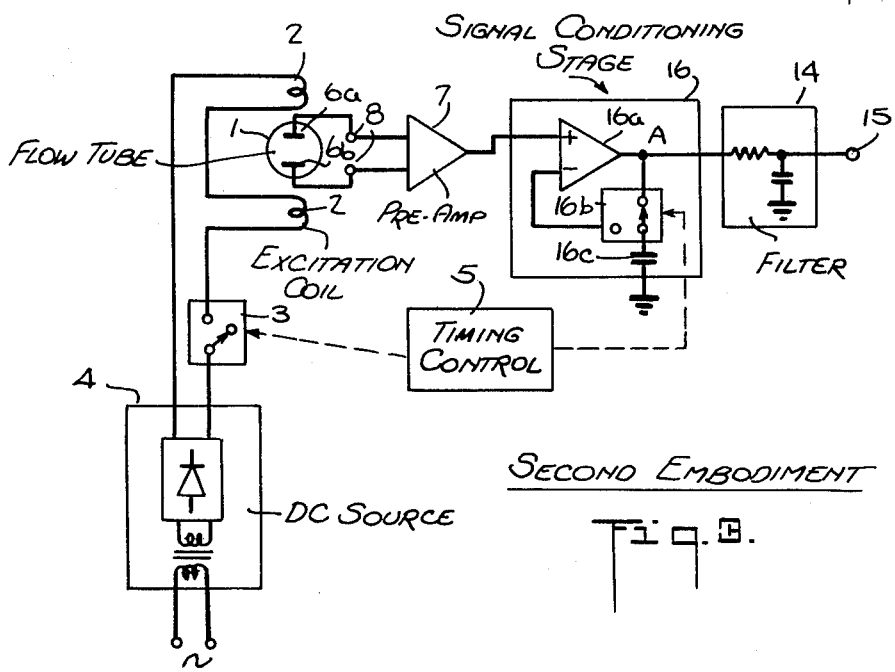

We shall now explain the operation of the first embodiment with reference to the wave forms shown in FIGS. 2(a) to (e). Switching circuit 3, controlled by timing control circuit 5, operates so that it is alternately on and off as shown by FIG. 2(a). Power from the DC source 4 is periodically turned off by switching circuit 3 at a rate determined by control circuit 5 and the resultant periodic DC is fed to excitation coil 2, thereby producing a periodic DC magnetic field in the flowmeter. It will be seen in FIG. 2(a) that the "on" or excitation period is about twice as long as the "off" or non-excitation period.

The output of the flowmeter during the excitation period and that during the non-excitation period appear alternately at output terminals 8. The output during the excitation period corresponds to the combined voltage of the live flow voltage signal and the zero voltage, whereas the output during the non-excitation period corresponds to zero voltage only. Each output is amplified by pre-amplifier 7 and then fed to switching circuits 9 and 10.

Switching circuits 9 and 10 are controlled by timing control circuit 5 in synchronism with switching circuit 3. Though each switching circuit is switched alternately as shown in FIGS. 2(b) and (d), when switching circuit 9, for instance, is controlled to operate in coincidence with the operation of switching circuit 3, then switching circuit 9 operates as shown in FIG. 2(b) and hold circuit 11 holds the output during the excitation period, while hold circuit 12 holds the output during the non-excitation period.

Thus hold circuit 11, as shown in FIG. 2(c), holds the output voltage $V_1$ developed at output terminals 8 immediately before the switching circuit 9 is turned off, this voltage being held until switching circuit 9 is again turned on. On the other hand, hold circuit 12, as shown in FIG. 2(e), holds the output voltage $V_2$ developed at the output terminals 8 immediately before switching circuit 10 is turned off, this voltage being held until the switching circuit 10 is again turned on.

The outputs of hold circuits 11 and 12 are smoothed by filter circuit 14. The filter circuit output is fed to subtracting circuit 13, thereby subtracting the held zero voltage from the combined voltage of the live flow voltage and the zero voltage to eliminate zero error due to polarization. Hence there is developed at terminal 15, an output signal $V_4$ which is free from the polarization effect.

Second Embodiment: FIG. 3 shows a second preferred embodiment of the invention, in which a signal conditioning stage 16 constituted by a differential amplifier 16a of limited gain (generally gain 1), a switching circuit 16b and a capacitor 16c, replaces hold circuits 11 and 12 as well as subtracting circuit 13 in FIG. 1. To the non-inverting input terminal of amplifier 16a, there is applied the output of pre-amplifier 7. The inverting input terminal of amplifier 16a is connected to a first fixed contact in switching circuit 16b whose movable contact is controlled by the timing control circuit 5. The second fixed contact of switching circuit 16b is connected to a point A, the output terminal of amplifier 16a. The movable contact of switching circuit 16b is connected to one end of the capacitor 16c whose other end is grounded.

This circuit is advantageous in that hold circuits 9 and 10, and subtracting circuit 13 in FIG. 1 are supplanted by a single stage 16. However, since the output of the stage is influenced by the on-off ratio of timing control circuit 5, the stage should generally be used only when the non-excitation period is short compared to the excitation period, or when, in the case of a fixed on-off ratio, the magnitude of the zero voltage is small.

The operation of the second embodiment shall now be explained with reference to the wave forms in FIG. 4(a) and (b).

Periodic DC power, as shown in FIG. 4(a), is applied to excitation coil 2. It will be seen that the excitation period is long compared to the non-excitation period. When the movable contact of switch 16b is shifted as shown by FIG. 3, during the non-excitation period to engage terminal A, capacitor 16c is charged with the output produced by amplifier 16a when the magnetic field is off. When the movable contact of switch 16b is disconnected from terminal A and switch 3 is closed so that DC power is applied to excitation coil 2, the zero voltage charge in the capacitor is now applied to the inverting input terminal of amplifier 16a. Amplifier 16a subtracts the zero point voltage from the combined voltage of the flow signal and the zero voltage during the excitation period. Therefore, the composite signal as shown by FIG. 4(b), which includes a zero error-compensated signal component and zero error voltage component, appears at the output terminal A of the amplifier 16a. The output indicated by the dotted line in FIG. 4(b) is obtained at output terminal 15 by smoothing the output of the amplifier 16a by means of filter circuit 14.

Third Embodiment: FIG. 5 shows a third preferred embodiment of this invention, in which the disadvantages of the second embodiment are obviated. In addition to the components shown in FIG. 3, a switching circuit 17 and a hold circuit 18 are provided between stage 16 and filter circuit 14. Switching circuit 17 is controlled by timing control circuit 5 so that the movable contact of switching circuit 17 is closed when capacitor 16c is connected to the inverting input terminal of amplifier 16a.

Hold circuit 18 is constituted by an amplifier 18a of limited gain, a capacitor 18b, and a switching circuit 18c. The non-inverting input terminal of amplifier 18a is connected to the movable contact of switching circuit 17, and the inverting input terminal of the same amplifier is connected to a first fixed contact of switching circuit 18c whose second fixed contact is grounded.

Output terminal B of amplifier 18a is connected both to one end of capacitor 18b and to the input of filter circuit 14. The other end of capacitor 18b is connected to the movable contact of switching circuit 18c. This switching circuit is controlled by timing control circuit 5 so that the movable contact is shifted to the non-inverting input terminal of amplifier 18a when switching circuit 17 is opened, as shown in FIG. 5. The movable contact of switching circuit 18c is shifted to the grounded fixed contact when the switching circuit 17 is closed.

The difference between the second and third embodiments of the invention will now be explained with reference to the wave forms in FIGS. 6(a) and 6(b).

The composite signal, as shown in FIG. 6(a), which includes a live signal component and a zero error component, appears at point A, as previously explained. At the outset, when the movable contact of switching circuit 16b is connected to output terminal A of amplifier 16a, as shown in FIG. 5, during the non-excitation period, this output is not applied to hold circuit 18. When, however, switching circuit 17 is closed during the excitation period, capacitor 18b of hold circuit 18 is charged by the zero error compensated output voltage of amplifier 16a.

Amplifier 18a holds the output of amplifier 16a, which is established immediately before switching circuit 17 is turned off during updating of the non-excitation period. Therefore, a signal output as shown in FIG. 6(b), in which the polarization effect is substantially eliminated, is obtained at output terminal B of amplifier 18a.

It is apparent from the foregoing explanation that a magnetic flowmeter in accordance with the present invention has the following features:

A. Because zero error compensation is effected by every updated zero voltage, a highly efficient zero error compensation can be accomplished.

B. Because external noise effects are eliminated, as well as polarization effects, a flowmeter which is stable against external noise can be obtained.

C. Because the magnetic field is in periodic DC form, eddy currents are not induced; hence zero shift effects do not occur at the electrodes even though the electrodes are contaminated.

D. Because the magnetic field is in periodic DC form, stray capacitance has no effect on the output signal; and hence flow measurement of low-conductivity fluids can be effected without difficulty.

E. Because spurious noise, i.e., 90° noise, does not appear, the construction of the transmitter can be made simple, and therefore the transmitter can be produced at low cost.

F. Since it is unnecessary to take into account electrostatic induction effects, the construction of the detector may be simplified.

G. Because zero point stability is improved markedly, the flowmeter is capable of highly efficient flow measurement of low-velocity fluids.

H. Even though spike noise is generated by every on-off operation of the switching circuit and/or external AC noise introduced in the detecting circuit, these noise components can be filtered out by means of a filter capacitor.

Although in the embodiments shown in FIGS. 1, 3 and 5, the compensation is carried out periodically, the compensation need not necessarily be periodic. For instance, when zero point a changes very slowly, the compensation can be carried out with a manual switching operation. On the other hand, semiconductor elements may be used as switching elements to effect fast switching operations.

Furthermore, although in the embodiment in accordance with the present invention, a non-magnetic field is created by interrupting the flow of DC power, the non-magnetic field may be produced by applying voltage of opposite polarity to another set of excitation coils mounted at diametrically-opposed points on the tube.

While there has been shown and described preferred embodiments in accordance with the invention, it will be appreciated that many changes and modifications may be made therein without, however, departing from the essential spirit thereof.

I claim:

1. In an electromagnetic flowmeter provided with a flow tube through which the fluid to be metered is conducted, the tube having a pair of electrodes mounted at diametrically-opposed positions and an excitation coil to produce a magnetic field in the tube which is transverse to the direction of the flow, the combination comprising:

A. a D-C power source connected to said coil,
B. a power switch interposed between said source and said coil to interrupt the flow of D-C thereto whereby during an excitation period in which D-C is applied, the output of the electrodes is the combined voltage of a live flow signal and a zero-point voltage induced in the liquid flowing in the tube, and during a non-excitation period in which DC is interrupted, the output is the zero-point voltage only,
C. means responsive to the action of said power switch to hold said zero point voltage produced during the non-excitation period,
D. means to subtract said held zero-point voltage from the combined voltage to produce an output voltage in which zero error is minimized, and
E. a timing control circuit operatively coupled to said switch to effect periodic operation thereof, whereby said DC excitation is periodic, said means responsive to the action of said power switch to hold said zero-point voltage and said means to subtract said held zero-point voltage from the combined voltage are constituted by a main differential amplifier whose non-inverting input is responsive to signals derived from the electrodes, the output of the amplifier being connected by a second switch during the non-excitation period to a capacitor whose charge represents said zero-point voltage, the zero-point voltage charge during the excitation period being transferred by said second switch to the inverting input whereby said amplifier subtracts the zero-point voltage from the combined voltage.

2. The combination as set forth in claim 1, further including a timing control circuit operatively coupled to said power switch to effect a periodic action thereof, said timing control circuit also governing the operation of said second switch.

3. The combination as set forth in claim 2, further including a second differential amplifier whose non-inverting input is connected to the output of said main differential amplifier through a third switch controlled by said timing control circuit, the output of said second differential amplifier being connected through a charging capacitor to the inverting input thereof through a fourth switch also controlled by said timing control circuit.

* * * * *